United States Patent Office 3,141,874
Patented July 21, 1964

3,141,874
WATER-SOLUBLE DISAZO DYES
Hans Ischer, Basel, and Carl Ryffel, Dornach, Switzerland, assignors to Sandoz Ltd., Basel, Switzerland
No Drawing. Filed Oct. 26, 1961, Ser. No. 147,725
Claims priority, application Switzerland Oct. 28, 1960
7 Claims. (Cl. 260—161)

This invention relates to water-soluble disazo dyes of the formula

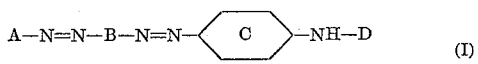

(I)

wherein

A represents the radical of an azo component coupled in ortho-position to a hydroxy or amino group, which latter group may be substituted,
B a diphenyl radical which may be substituted,
D an acyl or heterocyclic radical which is free from reactive substituents, and in which the nucleus C may be further substituted.

The process for the production of the new dyes consists in reacting a water-soluble disazo dye of the formula

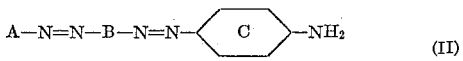

(II)

with a functional derivative of an organic acid or with a heterocyclic compound containing at least one exchangeable halogen atom, and when the resulting dyes contain further reactive substituents, replacing these by non-reactive substituents. The constituents based on the symbols A, B and C are so chosen that the final dye contains the number of water solubilizing groups necessary to render it soluble in water. A modification of the process consists in coupling the diazo compound of an amine of the formula

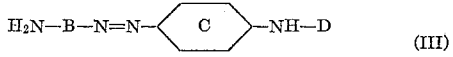

(III)

with a hydroxy or aminonaphthalene which may be substituted, in such a manner that the diazo group enters into ortho position to the hydroxy or amino group.

In this specification and claims the expression "reactive substituent" refers to a substituent which is capable of forming a chemical linkage with cellulose and polyamide fibers that is stable to treatment with 50% aqueous pyridine solution (the so-called pyridine test).

The aminoazo dye of Formula II which is used as starting product is obtained by coupling the tetrazo compound of 1 mol of an unsubstituted or substituted 4,4'-diamino-1,1'-diphenyl with 1 mol of a coupling component according to the invention and with 1 mol of an aminobenzene which couples in para-position to the amino group and may be substituted if desired.

The following are named as examples of suitable coupling compounds of the naphthalene series based upon the radical A: hydroxynaphthalene-mono-, -di- or -trisulfonic acids such as 1-hydroxynaphthalene-4- or -5- sulfonic acid, 2-hydroxynaphthalene-4-, -6-, -7- or -8-sulfonic acid, 1-hydroxynaphthalene-3,6-, -4,6- -4,7- or -4,8-disulfonic acid, 2-hydroxynaphthalene-3,6- and -6,8-disulfonic acid, 1-hydroxy- and 2-hydroxynaphthalene-3,6,8-trisulfonic acid and their mixtures, 2-hydroxynaphthalene, 2-amino-8-hydroxynaphthalene-6-sulfonic acid which couples in acid solution, 2-amino-8-hydroxynaphthalene-3,6-disulfonic acid, 2-(2',4',6'-trimethyl)-phenylamino-8-hydroxynaphthalene-6-sulfonic acid, 2-aminonaphthalene-6- or -7-sulfonic acid and their N-methyl derivatives, acylamino hydroxynaphthalene-mono- and -disulfonic acids, e.g. 2-acetylamino-5-hydroxynaphthalene-7-sulfonic acid, 1-benzoylamino - 8 - hydroxynaphthalene - 3,6-disulfonic acid, 2-N-carbomethoxyamino- or 2-N-carbethoxyamino-5-hydroxynaphthalene-1,7-disulfonic acid and 1,8-dihydroxynaphthalene-3,6-disulfonic acid.

Other suitable coupling components are e.g. 1-hydroxy-4-methylbenzene, 1-(2',5'-dichloro) - phenyl-3-methyl-5-pyrazolone-4'-sulfonic acid, 1-phenyl-3-methyl-5-pyrazolone, 1-(2'-chloro-6'-methyl) - phenyl-3-methyl-5-pyrazolone, 1-phenyl-5-pyrazolone-3-carboxylic acid, acetoacetylamino-benzene, 1-acetoacetylamino - 2,5 - dimethoxybenzene, 1-phenyl-3-methyl-5-pyrazolone-2',4' or -2',5'-disulfonic acid.

Important aminobenzenes which are based on the radical C are: aminobenzene, 1-amino-2- and -3-methylbenzene, 1-amino-3-acetylaminobenzene, 1-amino-2,5-dimethoxybenzene, 1-amino-5-methyl-2-methoxybenzene, 1-amino-3-propionyl and -butyrylaminobenzene, 1,3-diaminobenzene, 1-amino-2,5-dimethylbenzene, 1-amino-2,3-tetramethylenbenzene.

Examples of suitable diamino compounds based upon the radical B are: 4,4'-diamino-2,2'-dimethyl-1,1'-diphenyl, 4,4'-diamino-1,1'-diphenyl, 4,4'-diamino-2,2'-dimethyl-1,1'-diphenyl-5-sulfonic acid, 4,4'-diamino-2,2'-dimethyl-1,1'-diphenyl-6-sulfonic acid, 4,4'-diamino-3,3'-dimethyl-1,1'-diphenyl-6,6'-disulfonic acid, 4,4' - diamino - 1,1'-diphenyl-2,2'-disulfonic acid, 4,4'-diamino-1,1'-diphenyl-3,3'-disulfonic acid, 4,4'-diamino-1,1'-diphenyl-2,2', 5,5'-tetrasulfonic acid, 4,4'-diamino-3,3'-diethyl-1,1'-diphenyl-6,6'-disulfonic acid, 4,4-diamino-3,3'-dimethoxy-1,1'-diphenyl-6,6'-disulfonic acid, 4,4'-diamino-1,1'-diphenyl-3, 3'-dicarboxylic acid, 4,4'-diamino-3,3'dimethoxy-1,1'-diphenyl, 4,4'-diamino-3,3'-dimethyl-1,1'-diphenyl, 4,4'-diamino-1,1'-diphenyl-6,6'-sulfon-3,3'-disulfonic acid.

The following are enumerated as examples of functional derivatives of an organic acid suitable for use in the process: the halides, preferably the chlorides and bromides, and the anhydrides of substituted or unsubstituted fatty acids with 1 to 30 carbon atoms, e.g. acetyl chloride, acetic anhydride, maleic anhydride, isovaleric chloride, 2-ethylcaproic chloride, capric chloride, lauric chloride, oleic chloride, palmitic chloride, stearic anhydride and chloride, phenylacetic chloride, 2,4,5-trichlorophenoxyacetic chloride, the halides, preferably the chlorides and bromides, and the anhydrides of substituted or unsubstituted mono- or di-valent arenecarboxylic acids, preferably of the benzene or naphthalene series, and of arylalkyl- or cycloalkyl-carboxylic acids, e.g. 4-tertiarybutylbenzoic chloride, butylglycoloxyacetic chloride, phenoxy- and cresoxy-acetic chlorides, benzoic chloride, mono- and dichlorobenzoic chlorides, cyclohexylcarboxylic chloride, the halides of alkanesulfonic acids with 1 to 30 carbon atoms, substituted or unsubstituted arenesulfonic acids, preferably of the benzene or naphthalene series, halogenoformic acid esters of substituted or unsubstituted aliphatic alcohols with 1 to 20 carbon atoms, of cycloaliphatic and arylaliphatic alcohols and of substituted or unsubstituted phenols and naphthols, e.g. the chloroformic acid esters of ethyl, amyl, hexyl, octyl, decyl, lauryl, cetyl, benzyl, or cyclohexyl alcohol, or of hydroxybenzene, 4-octyl- or 4-cyclohexyl-1-hydroxybenzene, ethyleneglycol monoethyl, butyl, hexyl, octyl, or phenyl ether, diethyleneglycol mono-methyl, -butyl or -phenyl ester.

Heterocyclic compounds which contain an exchangeable halogen atom are e.g. cyanuric chloride and bromide, primary and secondary condensation products of the cyanuric halides of the composition

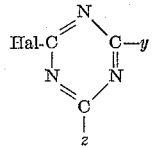

wherein y represents the radical, which may be further substituted, of a primary or secondary aliphatic, alicyclic, aromatic or heterocyclic amine, an aliphatic, alicyclic, aromatic or heterocyclic hydroxy or thiol compound, but more particularly the radical of aniline, its alkyl and sulfonic acid or carboxylic acid derivatives, of low molecular mono- and di-alkyl amines, or the radical of ammonia and z represents a halogen atom of a radical such as y, or 2,4,6-trichloropyrimidine or 2,4,6-tribromopyrimidine or their derivatives which contain in the 5-position e.g. the following substituents: methyl, ethyl, carboxylic acid or sulfonic acid amide which may be substituted on the nitrogen atom, carboxylic acid methyl or ethyl ester, acyl, e.g. benzoyl, alkylene, e.g. allyl, chlorovinyl, substituted alkyl, e.g. carboxymethyl, chloro or bromomethyl, a methylene group between two pyrimidine nuclei, 2,4,5,6-tetrachloro- or tetrabromo-pyrimidine, 2,6-dichloro- or dibromo-pyrimidine-4-carboxylic acid ethyl ester, 2,4,5-trichloropyrimidine, the 4- or 5-carboxylic acid amide or sulfonic acid amide derivatives of 2,6-dichloro- or -dibromo-pyrimidine which may be substituted on the nitrogen atom, 2,5,6-trichloro-4-methylpyrimidine, 2,4 - dichloro-5-chloromethyl-6-methylpyrimidine and 2,6 - dichloro-4-trichloromethylpyrimidine.

When the introduced radicals of organic acids or of organic compounds contain substituents which can be readily split off as anions or multiple linkages capable of addition, these reactive groups are converted into nonreactive groups, for example by reaction with suitable amino, hydroxy or thiol compounds or by replacement with hydroxy groups (in the case of esters) or sulfonic acid groups.

As a rule the procedure used for the introduction of the acyl radical is to dissolve the dye in aqueous medium, if necessary with the addition of an organic solvent, such as acetone, dioxan or pyridine, and then to add the acylating agent at a low or higher temperature, if necessary in presence of an acid-binding agent such as sodium hydroxide solution, sodium carbonate, sodium bicarbonate, calcium hydroxide, calcium carbonate or pyridine which at the same time may act as a catalyst.

The introduction of a cyanuric radical is best carried out in aqueous medium at about 0° C. and at a weakly acid reaction, e.g. at pH values between 3 and 5. The cyanuric halide is employed as such in solid form or in solution in an organic solvent, e.g. acetone. For the primary condensation products of a cyanuric halide it is best to choose a temperature of 0° to 60° C. and a pH-value of 3 to 7, for the secondary condensation products a temperature of 30° to 100° C. and a pH-value of 4 to 10, while for the di-, tri- and tetra-halogenopyrimidines temperatures between 40° and 100° C. are the most suitable. In the case of the cyanuric halides, their primary condensation products and the di-, tri- or tetra-halogenopyrimidines, the remaining exchangeable halogen atoms are exchanged for amino, hydroxy or thiol groups which may be substituted.

On completion of condensation or coupling the solution or suspension may be neutralized if desired, and the final dye is salted out with sodium or potassium chloride or precipitated with acid, then filtered with suction, washed and dried.

The dyes conforming to the invention are suitable, depending on their constitution, for the dyeing and printing of cellulosic fibers, wool, silk, leather and synthetic polyamide fibers from a weakly alkaline to weakly acid bath. They give bright, level shades of very good fastness to light, perspiration, washing, and alkaline and acid milling.

In the following examples the parts and percentages are by weight and the temperatures in degrees centigrade.

*Example 1*

20 parts of the dye which is obtained by tetrazotization of 4,4' - diamino - 5,5' - dimethyl - 1,1' - diphenyl - 2,2'-disulfonic acid and coupling with 1-amino-3-methylbenzene and 1-hydroxynaphthalene-4-sulfonic acid, are dissolved at 20° in 300 parts of water, 200 parts of acetone and 15 parts of pyridine. In the course of 24 hours lauryl chloride is dropped in until the starting dye is no longer indicated in a chromatogram. During the condensation reaction the pH value of the mixture is maintained at 6.5–7.0 by the addition of sodium bicarbonate. The precipitated acylated dye is filtered off, washed with a little water and dried. An excess of lauric acid is removed by extraction. The dye dyes wool, silk and nylon in bright scarlet shades of very good light and wet fastness.

The method of dyeing is as follows: The bath is set at 40° with 500 parts of water, 10 parts of anhydrous sodium sulfate and 2 parts of the dye. 100 parts of wool fabric are entered, and the bath is heated to 100° in 15 minutes and held at this temperature for 30 minutes. 20 parts of a 10% aqueous acetic acid solution are added and dyeing continued for 30 minutes at 100°. The wool is removed from the bath, rinsed with water and dried. The scarlet dyeing obtained is fast to light, washing, perspiration and milling.

*Example 2*

40 parts of the dye formed by tetrazotizing 4,4'-diamino-3,3'-dimethyl-1,1'-diphenyl-6,6'-disulfonic acid and coupling with 1-hydroxynaphthalene-4-sulfonic acid and 1-amino-3-methylbenzene are dissolved in 530 parts of water and 132 parts of pyridine. Chloroformic acid decyl ester is added dropwise at 15–20° over the next 24 hours with vigorous stirring until the chromatogram of a sample shows that the starting dye is completely reacted. The reaction mass is acidified to a pH value of 2.0 with about 20 parts of hydrochloric acid, and the precipitated dye is filtered off and washed with 50 parts of water. It is recrystallized by dissolving in 3000 parts of water and 120 parts of pyridine at 75° with the subsequent addition of 200 parts of 25% sodium chloride solution, and after cooling slowly to 5° in 5 hours it is filtered off, washed with 2% common salt solution, and dried at 80° with vacuum. The dye gives very brilliant scarlet shades on wool and nylon which possess excellent fastness to light, perspiration, washing, and alkaline and acid milling.

*Example 3*

18 parts of the dye

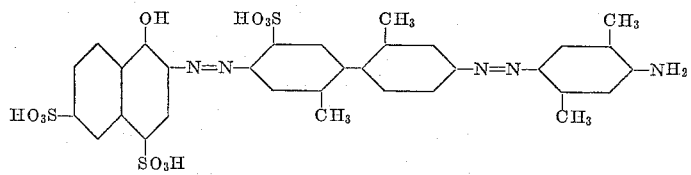

are dissolved in 176 parts of water and 44 parts of pyridine at 25°. Chloroformic acid decyl ester is added dropwise for 24 hours at 15–20° until the chromatogram of a sample indicates that the starting dye is completely reacted. The mass is acidified with hydrochloric acid and the precipitated dye filtered. Any excess of chloroformic acid ester which may be present is removed by extraction. The dye is recrystallized by dissolving in 160 parts of water and 7 parts of pyridine at 70° C. with the subsequent addition of 10 parts of common salt, and on cooling to 20° it is filtered off, washed with 5% common salt solution and dried. It dyes wool and nylon from a neutral to weakly acid bath in level scarlet shades of very good fastness to washing, perspiration, milling and light.

In the following table further valuable dyes of Formula I are listed which can be produced according to the particulars given in Examples 1 to 3. The meanings of the symbols A, B, C and D and the shade of the dyeings on wool are given in the headings of the table.

| No. | A= (I) | B=Radical bound in 4, 4'-position (II) | Coupling component for the introduction of Radical C (III) | D= (IV) | Shade on wool (V) |
|---|---|---|---|---|---|
| 4 | 1-hydroxy-4-sulfo-2-naphthyl | 5,5-dimethyl-1,1'-diphenyl-2,2'-disulfonic acid. | 1-amino-3-methylbenzene | $-COO-(CH_2)_{17}CH_3$ | Scarlet. |
| 5 | 1-hydroxy-3,6-disulfo-2-naphthyl. | 2,2'-dimethyl-1,1'-diphenyl-5-sulfonic acid. | Aminobenzene | $-CO(CH_2)_8CH_3$ | Orange. |
| 6 | 2-hydroxy-6-sulfo-1-naphthyl. | ----do---- | 2,5-dimethyl-1-aminobenzene | $-COO(CH_2)_{15}CH_3$ | Do. |
| 7 | 1-hydroxy-4,6-disulfo-2-naphthyl. | 3,3'-dimethoxy-1,1'-diphenyl. | 3-acetylamino-1-aminobenzene. | 2,4,5-trichlorophenoxyacetyl | Red. |
| 8 | 1-hydroxy-3,6,8-trisulfo-2-naphthyl. | 2,2'-dimethyl-1,1'-diphenyl. | 2,5-dimethyl-1-aminobenzene | $-COO(CH_2)_7CH_3$ | Do. |
| 9 | 2-hydroxy-3,6,8-trisulfo-1-naphthyl. | 1,1'-diphenyl | 2,5-dimethoxy-1-aminobenzene. | $-COCH_2CH(CH_3)_2$ | Do. |
| 10 | 2-hydroxy-1-naphthyl | 1,1'-diphenyl-2,5,2'-5' tetrasulfonic acid. | Aminobenzene | Phenylacetyl | Scarlet. |
| 11 | 1-hydroxy-4-sulfo-2-naphthyl. | 3,3'-dimethyl-1,1'-diphenyl-6,6'-disulfonic acid. | 1-amino-3-methylbenzene | Carbo-(4'-cyclohexyl)-phenoxy | Do. |
| 12 | ----do---- | ----do---- | ----do---- | 4-amino-6-phenylamino-1,3,5-triazinyl-(2). | Red. |
| 13 | ----do---- | ----do---- | 2-5,dimethyl-1-aminobenzene | 4-amino-6-chloropyrimidyl-(2) | Do. |
| 14 | ----do---- | 1,1'-diphenyl-3-sulfonic acid. | 1-amino-3-methylbenzene | 4-amino-6-(4'-sulfophenylamino)-1,3,5-triazinyl-(2). | Orange. |
| 15 | ----do---- | 2,2'-dimethyl-1,1'-diphenyl-5-sulfonic acid. | ----do---- | $-COO-(CH_2)_{10}CH_3$ | Do. |
| 16 | ----do---- | 3,3'-dimethyl-1,1'-diphenyl-6,6'-disulfonic acid. | 1-amino-2,5-dimethylbenzene | $-COO(CH_2)_5CH_3(CH_3)_2$ | Scarlet. |
| 17 | ----do---- | ----do---- | 1-amino-2-methylbenzene | $-COO(CH_2)_{11}CH_3$ | Orange-scarlet. |
| 18 | ----do---- | ----do---- | 1-amino-3-methylbenzene | $COO(CH_2)_7CH_3$ | Scarlet. |
| 19 | 1-hydroxy-4-sulfo-6-chloro-2-naphthyl. | ----do---- | 1-amino-2,5-dimethylbenzene | $-CO(CH_2)_{10}CH_3$ | Do. |
| 20 | 1-hydroxy-4-sulfo-2-naphthyl. | ----do---- | Aminobenzene | $-CO(CH_2)_8CH_3$ | Do. |
| 21 | 1-hydroxy-3,5-disulfo-8-amino-2-naphthyl. | 2,2'-dimethyl-1,1'-diphenyl-6-sulfonic acid. | 1-amino-3-methoxybenzene | $-CO-(CH_2)_{10}CH_3$ | Violet. |
| 22 | 1-hydroxy-4-sulfo-2-naphthyl. | 3,3'-dimethyl-1,1'-diphenyl-6,6'-disulfonic acid. | 1-amino-2,5-dimethylbenzene | $-COO(CH_2)_9CH_3$ | Scarlet. |
| 23 | ----do---- | 2,2'-dimethyl-1,1'-diphenyl-5-sulfonic acid. | 1-amino-3-methylbenzene | $-COO(CH_2)_7CH_3$ | Orange. |
| 24 | ----do---- | 3,3'-dimethyl-1,1'-diphenyl-6,6'-disulfonic acid. | 1-amino-2,5-dimethylbenzene | $-COO(CH_2)_{11}CH-(CH_3)_2$ | Scarlet. |
| 25 | 2-hydroxy-6-sulfo-1-naphthyl. | ----do---- | ----do---- | Phenylacetyl | Orange-scarlet. |
| 26 | 1-hydroxy-4-sulfo-2-naphthyl. | ----do---- | 1-amino-3-methylbenzene | $-COO(CH_2)_5CH(CH_3)_2$ | Scarlet. |
| 27 | 2-acetylamino-5-hydroxy-7-sulfo-6-naphthyl. | 1,1'-diphenyl-2,2'-sulfon-5,5-disulfonic acid. | 1-amino-2,5-dimethylbenzene | $-CO(CH_2)_{10}CH_3$ | Violet. |
| 28 | 1-hydroxy-4-sulfo-2-naphthyl. | 3,3'-dimethyl-1,1'-diphenyl-6,6'-disulfonic acid. | Aminobenzene | $-CO-(CH_2)_{10}CH_3$ | Scarlet. |
| 29 | 1-hydroxy-4-sulfo-6-chloro-2-naphthyl. | 1,1'-diphenyl-2,2'-disulfonic acid. | 1-amino-2,5-dimethylbenzene | 4,6-dibutylamino-2-triazinyl | Do. |
| 30 | ----do---- | 3,3'-dimethyl-1,1'-diphenyl-6,6'-disulfonic acid. | ----do---- | $-CO(CH_2)_8CH_3$ | Do. |
| 31 | 1-hydroxy-4-sulfo-2-naphthyl. | 2,2'-dimethyl-1,1'-diphenyl-5-sulfonic acid. | 1-amino-3-methylbenzene | $-COO(CH_2)_9CH_3$ | Orange. |
| 32 | ----do---- | 3,3'-dimethyl-1,1'-diphenyl-6,6'-disulfonic acid. | 1-amino-2,5-dimethylbenzene | $-COO(CH_2)_{13}CH-(CH_3)_2$ | Scarlet. |
| 33 | 2-amino-8-hydroxy-6-sulfo-1-naphthyl. | ----do---- | ----do---- | 2,4,5-trichlorophenoxyacetyl | Violet. |
| 34 | 1-hydroxy-4-sulfo-2-naphthyl. | ----do---- | 1-amino-3-methylbenzene | $-COO(CH_2)_{10}CH-(CH_3)_2$ | Scarlet. |
| 35 | 1-hydroxy-3,8-disulfo-2-naphthyl. | 1,1'-diphenyl-2,2'-sulfon-5,5'-disulfonic acid. | 1-amino-3-propionylaminobenzene. | $-CO(CH_2)_{10}CH_3$ | Red. |
| 36 | 1-hydroxy-4-sulfo-2-naphthyl. | 3,3'-dimethyl-1,1'-diphenyl-6,6'-disulfonic acid. | Aminobenzene | $-CO(CH_2)_{12}CH_3$ | Scarlet. |
| 37 | 1-hydroxy-4-sulfo-6-chloro-2-naphthyl. | 1,1'-diphenyl-2,2'-disulfonic acid. | 1-amino-2,5-dimethylbenzene | $-CO(CH_2)_8CH_3$ | Do. |
| 38 | 1-hydroxy-3,6-disulfo-2-naphthyl. | 2,2'-dimethyl-1,1'-diphenyl-5-sulfonic acid. | 1-amino-3-methylbenzene | $-COO(CH_2)_9CH_3$ | Orange. |
| 39 | 1-hydroxy-4-sulfo-2-naphthyl. | ----do---- | ----do---- | $-COO(CH_2)_{11}CH_3$ | Do. |
| 40 | ----do---- | 3,3'-dimethyl-1,1'-diphenyl-6,6'-disulfonic acid. | 1-amino-2,5-dimethylbenzene | $-COO(CH_2)_{15}CH-(CH_3)_2$ | Scarlet. |
| 41 | 2-acetylamino-8-hydroxy-6-sulfo-7-naphthyl. | ----do---- | ----do---- | 1-naphthyl | Violet. |
| 42 | 1-hydroxy-4-sulfo-2-naphthyl. | ----do---- | 1-amino-3-methylbenzene | $-COO(CH_2)_{11}CH-(CH_3)_2$ | Scarlet. |
| 43 | 1-hydroxy-3,8-disulfo-2-naphthyl. | 1,1'-diphenyl-2,2'-sulfo-5,5'-disulfonic acid. | 1-amino-3-butyrylaminobenzene. | $-COO(CH_2)_9CH_3$ | Red. |
| 44 | 1-hydroxy-4-sulfo-2-naphthyl. | 3,3'-dimethyl-1,1'-diphenyl-6,6'-disulfonic acid. | Aminobenzene | $-COO(CH_2)_7CH_3$ | Scarlet. |
| 45 | 1-hydroxy-4-sulfo-6-chloro-2-naphthyl. | 1,1'-diphenyl-2,2'-disulfonic acid. | 1-amino-2,5-dimethylbenzene | $-CO(CH_2)_{10}CH_3$ | Do. |
| 46 | 1-hydroxy-4-sulfo-8-methylurethane-2-naphthyl. | 3,3'-dimethyl-1,1'-diphenyl-6,6'-disulfonic acid. | 1-amino-3-methylbenzene | $-CO(CH_2)_8CH_3$ | Violet. |
| 47 | 1-hydroxy-3,6-disulfo-2-naphthyl. | 2,2'-dimethyl-1,1'-diphenyl-5-sulfonic acid. | 1-amino-2-methylbenzene | 2-methylnaphthalene-6-sulfonyl | Red. |
| 48 | 1-hydroxy-4-sulfo-2-naphthyl. | 3,3'-dimethyl-1,1'-diphenyl-6,6'-disulfonic acid. | 1-amino-3-acetylaminobenzene. | $-CO-(CH_2)_8CH_3$ | Scarlet. |
| 49 | 2-amino-5-hydroxy-7-sulfo-1-naphthyl. | ----do---- | 1-amino-2,5-dimethylbenzene | Benzoyl | Violet. |
| 50 | 1-hydroxy-4-sulfo-2-naphthyl. | ----do---- | 1-amino-3-methylbenzene | $-COO(CH_2)_{13}CH-(CH_3)_2$ | Scarlet. |
| 51 | 1-hydroxy-3,6-disulfo-2-naphthyl. | 3,3'-dimethyl-1,1'-diphenyl | ----do---- | $-COCH(C_2H_5)(CH_2)_3-CH_3$ | Orange. |

| No. | A= (I) | B=Radical bound in 4, 4'-position (II) | Coupling component for the introduction of Radical C (III) | D= (IV) | Shade on wool (V) |
|---|---|---|---|---|---|
| 52 | 1-hydroxy-4-sulfo-2-naphthyl. | 3,3'-dimethyl-1,1'-diphenyl-6,6'-disulfonic acid. | Aminobenzene | —COO(CH$_2$)$_5$CH(CH$_3$)$_2$ | Scarlet. |
| 53 | 1-hydroxy-4-sulfo-6-chloro-2-naphthyl. | 1,1'-diphenyl-2,2'-disulfonic acid. | 1-amino-2,5-dimethylbenzene | —COO(CH$_2$)$_9$CH$_3$ | Do. |
| 54 | 1-hydroxy-3,6-disulfo-8-benzoylamino-2-naphthyl. | 3,3'-dimethyl-1,1'-diphenyl-6,6'-disulfonic acid. | 1-amino-3-methylbenzene | —CO(CH$_2$)$_8$CH$_3$ | Violet. |
| 55 | 1-hydroxy-3,6-disulfo-2-naphthyl. | 2,2'-dimethyl-1,1'-diphenyl-5-sulfonic acid. | Aminobenzene | Carbobenzene | Red. |
| 56 | 1-hydroxy-4-sulfo-2-naphthyl. | 3,3'-dimethyl-1,1'-diphenyl-5-sulfonic acid. | 1-amino-3-acetylaminobenzene. | —CO(CH$_2$)$_{10}$CH$_3$ | Scarlet. |
| 57 | 2-cinnomoylamino-5-hydroxy-7-sulfo-6-naphthyl. | ___do___ | 1-amino-3-methylbenzene. | Cyclohexylcarboyl | Red. |
| 58 | 1-hydroxy-4-sulfo-2-naphthyl. | ___do___ | ___do___ | —COO(CH$_2$)$_{15}$CH—(CH$_3$)$_2$ | Scarlet. |
| 59 | 1-hydroxy-3,6-disulfo-2-naphthyl. | 3,3'-dimethyl-1,1'-diphenyl | ___do___ | —COCH=CHCOOH | Orange. |
| 60 | 1-hydroxy-4-sulfo-2-naphthyl. | 3,3'-dimethyl-1,1'-diphenyl-6,6'-disulfonic acid. | Aminobenzene | —COO(CH$_2$)$_9$CH$_3$ | Scarlet. |
| 61 | 2-hydroxy-6-sulfo-2-naphthyl. | 1,1'-diphenyl-2,2'-disulfonic acid. | 1-amino-2,5-dimethylbenzene. | —COO(CH$_2$)$_{11}$CH$_3$ | Orange. |
| 62 | 1-hydroxy-3-sulfo-7-ethylurethane-2-naphthyl. | 3,3'-dimethyl-1,1'-diphenyl-6,6'-disulfonic acid. | 1-amino-3-methylbenzene | —CO(CH$_2$)$_8$CH$_3$ | Violet. |
| 63 | 1-hydroxy-3,8-disulfo-2-naphthyl. | 2,2'-dimethyl-1,1'-diphenyl-5-sulfonic acid. | ___do___ | Carbocyclohexyl | Red. |
| 64 | 1-hydroxy-4-sulfo-2-naphthyl. | 3,3'-dimethyl-1,1'-diphenyl-6,6'-disulfonic acid. | 1-amino-3-acetylaminobenzene. | —COO(CH$_2$)$_7$CH$_3$ | Scarlet. |
| 65 | 2-(2',4',6'-trimethyl)-phenylamino-8-hydroxy-6-sulfo-1-naphthyl. | ___do___ | 1-amino-3-methylbenzene | 4-tert. butylbenzoyl | Brown-red. |
| 66 | 1-hydroxy-4-sulfo-2-naphthyl. | ___do___ | 1-amino-2,5-dimethylbenzene. | —CO(CH$_2$)$_6$CH$_3$ | Scarlet. |
| 67 | 1-hydroxy-3,6,8-trisulfo-2-naphthyl. | 3-3'-dimethyl-1,1'-diphenyl | 1-amino-3-methylbenzene | —CO(CH$_2$)$_{10}$CH$_3$ | Violet. |
| 68 | 1-hydroxy-4-sulfo-2-naphthyl. | 3,3'-dimethyl-1,1'-diphenyl-6,6'-disulfonic acid. | Aminobenzene | —COO(CH$_2$)$_{11}$CH$_3$ | Scarlet. |
| 69 | 1-hydroxy-6-sulfo-2-naphthyl. | 1,1'-diphenyl-3,3'-disulfonic acid. | 1-amino-2,5-dimethylbenzene. | —CO(CH$_2$)$_{10}$CH$_3$ | Orange. |
| 70 | 1-hydroxy-3-sulfo-6-methylurethane-2-naphthyl. | 3,3'-dimethyl-1,1'-diphenyl-6,6'-disulfonic acid. | 1-amino-3-methylbenzene | —CO(CH$_2$)$_8$CH$_3$ | Violet. |
| 71 | 1-hydroxy-3,8-disulfo-2-naphthyl. | 2,2'-dimethyl-1,1'-diphenyl-5-sulfonic acid. | ___do___ | Carbo-4-amylphenoxy | Red. |
| 72 | 1-hydroxy-4-sulfo-2-naphthyl. | 3,3'-dimethyl-1,1'-diphenyl-6,6'-disulfonic acid. | 1-amino-3-acetylaminobenzene. | —COO(CH$_2$)$_9$CH$_3$ | Scarlet. |
| 73 | 1-hydroxy-4-sulfo-6-chloro-2-naphthyl. | ___do___ | 1-amino-3-methylbenzene | Butylglycoloxyacetyl | Do. |
| 74 | 1-hydroxy-4-sulfo-2-naphthyl. | ___do___ | 1-amino-2,5-dimethylbenzene. | —CO(CH$_2$)$_8$CH$_3$ | Do. |
| 75 | 1-hydroxy-3,6,8-trisulfo-2-naphthyl. | 3,3'-dimethyl-1,1'-diphenyl | 1-amino-3-methylbenzene | —CO(CH$_2$)$_8$CH$_3$ | Violet. |
| 76 | 1-hydroxy-4-sulfo-2-naphthyl. | 3,3'-dimethyl-1,1'-diphenyl-6,6'-disulfonic acid. | Aminobenzene | —CO(CH$_2$)$_6$CH$_3$ | Scarlet. |
| 77 | 1-hydroxy-6-sulfo-2-naphthyl. | 1,1'-diphenyl-3,3'-disulfonic acid. | 1-amino-2,5-dimethylbenzene. | —CO(CH$_2$)$_{10}$CH$_3$ | Orange. |
| 78 | 1-hydroxy-4-sulfo-8-propionylamino-2-naphthyl. | 3,3'-dimethyl-1,1'-diphenyl-6,6'-disulfonic acid. | 1-amino-3-methylbenzene | —CO(CH$_2$)$_8$CH$_3$ | Violet. |
| 79 | 1-hydroxy-4,6-disulfo-2-naphthyl. | 2,2'-dimethyl-1,1'-diphenyl-5-sulfonic acid. | 1-amino-2,5-dimethoxybenzene. | Carbo-ethyleneglycolmonoethylether. | Red. |
| 80 | 1-hydroxy-4-sulfo-2-naphthyl. | 3,3'-dimethyl-1,1'-diphenyl-6,6'-disulfonic acid. | 1-amino-3-acetylaminobenzene. | —COO(CH$_2$)$_{11}$CH$_3$ | Scarlet. |
| 81 | 1-hydroxy-3,8-disulfo-2-naphthyl. | ___do___ | 1-amino-3-methylbenzene | m-Cresoxyacetyl | Red. |
| 82 | 1-hydroxy-4-sulfo-2-naphthyl. | ___do___ | 1-amino-2,5-dimethylbenzene. | —CO(CH$_2$)$_{10}$CH$_3$ | Scarlet. |
| 83 | 1-hydroxy-4-sulfo-6-chloro-2-naphthyl. | 3,3'-dimethoxy-1,1'-diphenyl-6,6'-disulfonic acid. | 1-amino-3-methylbenzene | —COO(CH$_2$)$_9$CH$_3$ | Do. |
| 84 | 1-hydroxy-4-sulfo-2-naphthyl. | 3,3'-dimethyl-1,1'-diphenyl-6,6'-disulfonic acid. | ___do___ | —CO(CH$_2$)$_6$CH$_3$ | Do. |
| 85 | 1-hydroxy-4-sulfo-6-chloro-2-naphthyl. | 1,1'-diphenyl-3,3'-disulfonic acid. | ___do___ | —COO(CH$_2$)$_{15}$CH$_3$ | Orange. |
| 86 | 1-hydroxy-3-sulfo-7-acrylamino-2-naphthyl. | 3,3'-dimethyl-1,1'-diphenyl-6,6'-disulfonic acid | ___do___ | —CO(CH$_2$)$_8$CH$_3$ | Violet. |
| 87 | 1-hydroxy-4,6-disulfo-2-naphthyl. | 2,2'-dimethyl-1,1'-diphenyl-5-sulfonic acid. | ___do___ | Toluenesulfonyl | Red. |
| 88 | 1-hydroxy-4-sulfo-2-naphthyl. | 3,3'-dimethyl-1,1'-diphenyl-6,6'-disulfonic acid. | 1-amino-2-methylbenzene | —CO(CH$_2$)$_8$CH$_3$ | Scarlet. |
| 89 | 1-acetylamino-8-hydroxy-4-sulfo-7-naphthyl. | ___do___ | 1-amino-3-methylbenzene | Dodecansulfonyl | Violet. |
| 90 | 1-hydroxy-4-sulfo-2-naphthyl. | ___do___ | 1-amino-2,5-dimethylbenzene. | —CO(CH$_2$)$_{12}$CH$_3$ | Scarlet. |
| 91 | ___do___ | 3,3'-dimethoxy-1,1'-diphenyl-6,6'-disulfonic acid. | 1-amino-3-methylbenzene | —COO(CH$_2$)$_{11}$CH$_3$ | Do. |
| 92 | ___do___ | 3,3'-dimethyl-1,1'-diphenyl-6,6'-disulfonic acid. | ___do___ | —CO(CH$_2$)$_8$CH$_3$ | Do. |
| 93 | 1-hydroxy-4-sulfo-6-chloro-2-naphthyl. | 1,1'-diphenyl-3,3'-disulfonic acid. | Aminobenzene | —COO(CH$_2$)$_{13}$CH$_3$ | Orange. |
| 94 | 1-hydroxy-3-sulfo-6-crotonylamino-2-naphthyl. | 3,3'-dimethyl-1,1'-diphenyl-6,6'-disulfonic acid. | 1-amino-3-methylbenzene | —CO(CH$_2$)$_8$CH$_3$ | Violet. |
| 95 | 1-hydroxy-3,6-disulfo-8-acetylamino-2-naphthyl. | 2,2'-dimethyl-1,1'-diphenyl-5-sulfonic acid. | ___do___ | 4-methyl-6-chloro-2-pyrimidyl | Do. |
| 96 | 1-hydroxy-4-sulfo-2-naphthyl. | 3,3'-dimethyl-1,1'-diphenyl-6,6'-disulfonic acid. | 1-amino-2-methyl- | —CO(CH$_2$)$_{10}$CH$_3$ | Scarlet. |
| 97 | 1-(2',5'-dichloro-4'-sulfo)-phenyl-3-methyl-5-hydroxy-4-pyrazolyl. | ___do___ | Aminobenzene | —COO(CH$_2$)$_9$CH$_3$ | Yellow. |
| 98 | 1-hydroxy-4-sulfo-2-naphthyl. | ___do___ | 1-amino-2,5-dimethylbenzene. | —CO(CH$_2$)$_{14}$CH$_3$ | Scarlet. |

| No. | A= (I) | B = Radical bound in 4, 4'- position (II) | Coupling component for the introduction of Radical C (III) | D= (IV) | Shade on wool (V) |
|---|---|---|---|---|---|
| 99 | 1-hydroxy-3,8-disulfo-2-naphthyl. | 1,1'-diphenyl-3,3'-dicarboxylic acid. | 1-amino-3-methylbenzene | 2,4,6-trimethylphenyl-1-acetyl | Orange. |
| 100 | 1-hydroxy-4-sulfo-2-naphthyl. | 3,3'-dimethyl-1,1'-diphenyl-6,6'-disulfonic acid. | ___do___ | Radical of oleic acid | Scarlet. |
| 101 | 1-hydroxy-4-sulfo-6-chloro-2-naphthyl. | 3,3'-diethyl-1,1'-diphenyl-6,6'-disulfonic acid. | Aminobenzene | —COO(CH$_2$)$_9$CH$_3$ | Do. |
| 102 | 1-hydroxy-4-sulfo-2-naphthyl. | 1,1'-diphenyl-2,2'-disulfonic acid | 1-amino-3-methylbenzene | —CO(CH$_2$)$_{10}$CH$_3$ | Do. |
| 103 | ___do___ | 3,3'-dimethyl-1,1'-diphenyl-6,6'-disulfonic acid. | 1-amino-2-methylbenzene | COO(CH$_2$)$_7$CH$_3$ | Scarlet. |
| 104 | 1-(3'-sulfo)-phenyl-3-methyl-5-amino-4-pyrazolyl. | ___do___ | Aminobenzene | —COO(CH$_2$)$_9$CH$_3$ | Yellow. |
| 105 | 1-hydroxy-4-sulfo-2-naphthyl. | ___do___ | 1-amino-2,5-dimethylbenzene | —COO(CH$_2$)$_7$CH$_3$ | Scarlet. |
| 106 | 2-hydroxy-3,6,8-trisulfo-1-naphthyl. | 3,3'-dichloro-1,1'-diphenyl | 1-amino-3-methylbenzene | 2,4,6-trimethylphenyl-1-acetyl | Red. |
| 107 | 1-hydroxy-4-sulfo-2-naphthyl. | 3,3'-dimethyl-1,1'-diphenyl-6,6'-disulfonic acid. | ___do___ | —CO(CH$_2$)$_{12}$CH$_3$ | Scarlet. |
| 108 | 1-hydroxy-4-sulfo-6-chloro-2-naphthyl. | 3,3'-diethyl-1,1'-diphenyl-6,6'-disulfonic acid. | Aminobenzene | 2,4,5-trichlorophenylacetyl | Do. |
| 109 | 1-hydroxy-4-sulfo-2-naphthyl. | 1,1'-diphenyl-2,2'-disulfonic acid. | 1-amino-3-methylsulfonic acid. | —COO(CH$_2$)$_{11}$CH$_3$ | Scarlet. |
| 110 | ___do___ | 3,3'-dimethyl-1,1'-diphenyl-6,6'-disulfonic acid. | 1-amino-2-methylbenzene | —COO(CH$_2$)$_9$CH$_3$ | Do. |
| 111 | ___do___ | 2,2'-dimethyl-1,1'-diphenyl-5-sulfonic acid. | 1-amino-3-methylbenzene | —CO(CH$_2$)$_8$CH$_3$ | Orange. |
| 112 | 1-hydroxy-3,6,8-trisulfo-2-naphthyl. | 2,5,2',5'-tetramethyl-1,1'-diphenyl | ___do___ | —CO(CH$_2$)$_6$CH$_3$ | Red. |
| 113 | 1-hydroxy-4-sulfo-2-naphthyl. | 3,3'-dimethyl-1,1'-diphenyl-6,6'-disulfonic acid. | ___do___ | —CO(CH$_2$)$_{14}$CH$_3$ | Scarlet. |
| 114 | 1-hydroxy-4-sulfo-6-chloro-2-naphthyl. | 3,3'-diethyl-1,1'-diphenyl-6,6'-disulfonic acid. | 1-amino-2-ethylbenzene | —COO(CH$_2$)$_9$CH$_3$ | Do. |

Formulae of representative dyes of the foregoing examples are as follows:

*Example 1*

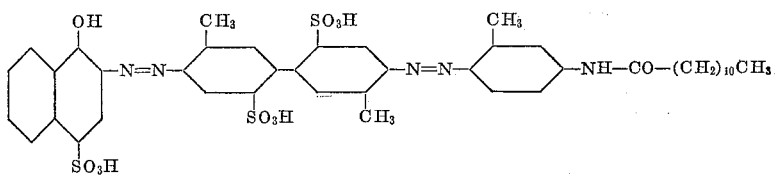

*Example 2*

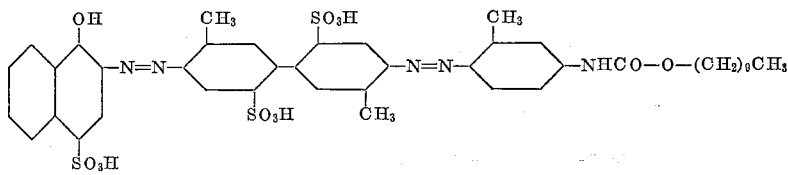

*Example 3*

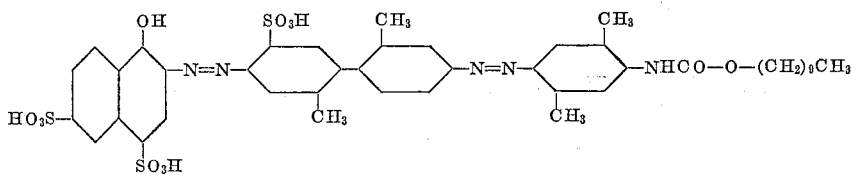

*Example 22*

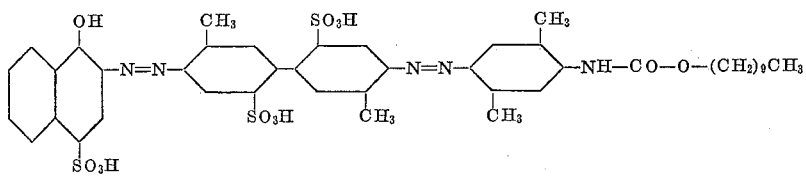

*Example 30*

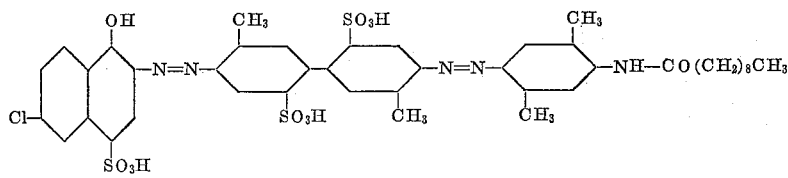

Example 38

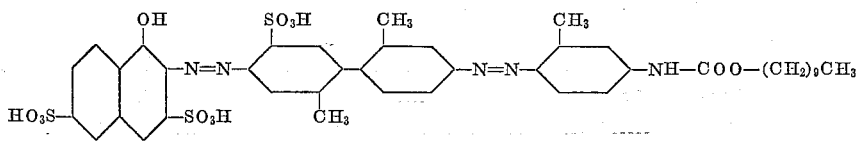

Having thus disclosed the invention what we claim is:

1. Water-soluble disazo dye of the formula

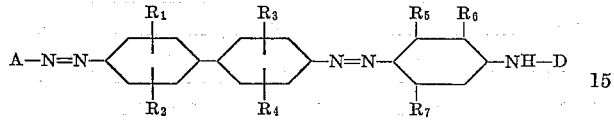

wherein

A is a radical selected from the group consisting of 1-chloro - (sulfo) - phenyl - 3 - methyl-5-hydroxy-4-pyrazolyl, 1-(sulfo)-phenyl-3-methyl-5-amino-4-pyrazolyl, and substituted naphthyl coupled in ortho-position to a member selected from the group consisting of —OH and —NH$_2$, the substituents of the substituted naphthyl being selected from the group consisting of hydroxy, amino, chloro, sulfo, acetylamino, cinnamoylamino, trimethylphenylamino, lower alkyl urethane, crotonylamino, acrylamino, propionylamino and benzoylamino, $R_1$ and $R_2$ each is a member selected from the group consisting of hydrogen, chloro, methyl and sulfo, $R_3$ and $R_4$ each is a member selected from the group consisting of hydrogen, methyl and sulfo, $R_5$ is a member selected from the group consisting of hydrogen, methyl, methoxy, acetylamino, propionylamino and butyrylamino, $R_6$ is a member selected from the group consisting of hydrogen, lower alkyl and methoxy, $R_7$ is a member selected from the group consisting of hydrogen, methyl and methoxy, each of $R_6$ and $R_7$ being hydrogen when $R_5$ is a member selected from the group consisting of acetylamino, propionylamino and butyrylamino, and D is a member selected from the group consisting of —CO—X and —CO—O—V, X being an aliphatic hydrocarbon radical with from 6 to 18 carbon atoms, and V being an aliphatic hydrocarbon radical with from 7 to 18 carbon atoms.

2. A water-soluble disazo dye of the formula

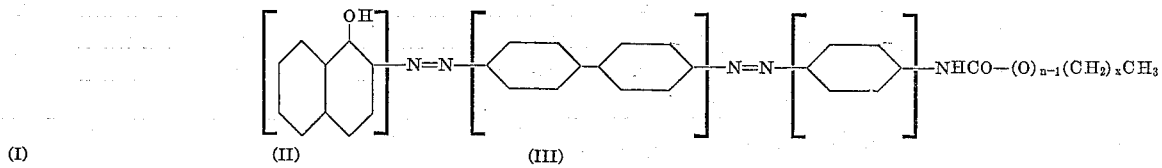

wherein nuclei I and II are sulfonated, the total number of sulfo groups in the two nuclei being 3, nuclei II and III being methylated, the total number of methyl groups in each of said nuclei II and III being two, any further substituent on nucleus I being Cl and there being no further substituents on nuclei II and III, the methyl groups on the latter being p-positioned relative to each other, $n$ is a whole number from 1 to 2 inclusive, and $x$ is a whole number from 8 to 10 inclusive.

3. A water-soluble disazo dye of the formula

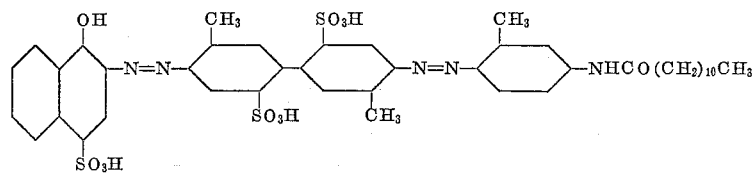

4. A water-soluble disazo dye of the formula

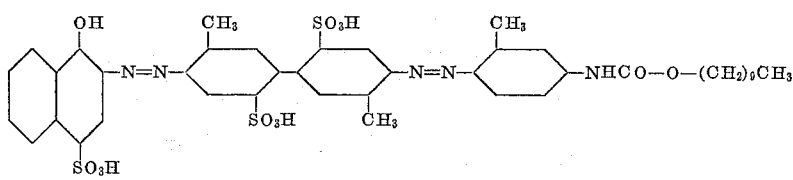

5. A water-soluble disazo dye of the formula

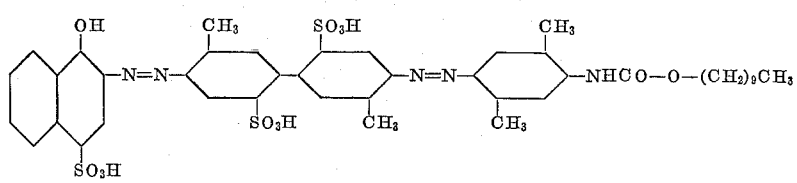

6. A water-soluble disazo dye of the formula
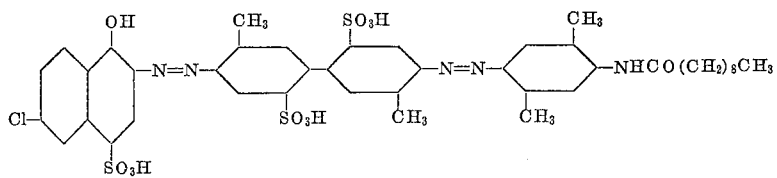
7. A water-soluble disazo dye of the formula
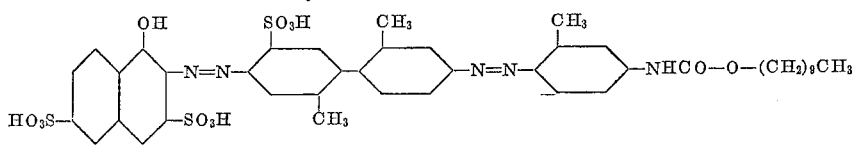
References Cited in the file of this patent
UNITED STATES PATENTS
| | | |
|---|---|---|
| 1,067,881 | Richard | July 22, 1913 |
| 2,034,668 | Reindel et al. | Mar. 17, 1936 |
| 2,080,209 | Kappeler | May 11, 1937 |
| 2,367,053 | Reynolds | Jan. 9, 1945 |
| 2,402,538 | Dreyfus | June 25, 1946 |